United States Patent
Deng et al.

(10) Patent No.: US 12,543,198 B2
(45) Date of Patent: Feb. 3, 2026

(54) METHOD FOR RECEIVING MULTICAST SERVICE DATA, TERMINAL DEVICE, AND NON-TRANSITORY COMPUTER-READABLE STORAGE MEDIUM

(71) Applicant: SPREADTRUM COMMUNICATIONS (SHANGHAI) CO., LTD., Shanghai (CN)

(72) Inventors: Yun Deng, Shanghai (CN); Lifeng Han, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 432 days.

(21) Appl. No.: 18/010,887

(22) PCT Filed: Apr. 12, 2021

(86) PCT No.: PCT/CN2021/086680
§ 371 (c)(1),
(2) Date: Dec. 16, 2022

(87) PCT Pub. No.: WO2021/253944
PCT Pub. Date: Dec. 23, 2021

(65) Prior Publication Data
US 2023/0239901 A1    Jul. 27, 2023

(30) Foreign Application Priority Data
Jun. 16, 2020  (CN) .......................... 202010551551.2

(51) Int. Cl.
| | |
|---|---|
| *H04W 72/30* | (2023.01) |
| *H04L 12/18* | (2006.01) |
| *H04W 4/06* | (2009.01) |
| *H04W 72/12* | (2023.01) |
| *H04W 72/232* | (2023.01) |

(52) U.S. Cl.
CPC ............. *H04W 72/30* (2023.01); *H04W 4/06* (2013.01); *H04W 72/12* (2013.01); *H04W 72/232* (2023.01); *H04L 12/189* (2013.01)

(58) Field of Classification Search
CPC ....... H04W 72/30; H04W 4/06; H04W 72/12; H04W 72/232; H04L 12/189; H04L 5/0094; H04L 5/0053; H04L 5/0064
See application file for complete search history.

(56) References Cited

U.S. PATENT DOCUMENTS

| | | |
|---|---|---|
| 2020/0163031 A1 | 5/2020 | Loehr et al. |
| 2021/0111857 A1* | 4/2021 | Zhou ..................... H04W 72/23 |

(Continued)

FOREIGN PATENT DOCUMENTS

| | | |
|---|---|---|
| CN | 109997396 A | 7/2019 |
| CN | 110121176 A | 8/2019 |

(Continued)

OTHER PUBLICATIONS

Xingqin Lin, et al., "A Primer on Bandwidth Parts in 5G New Radio", Apr. 2, 2020.

(Continued)

*Primary Examiner* — Charles C Jiang
*Assistant Examiner* — Rachel Elizabeth Marks
(74) *Attorney, Agent, or Firm* — HAUPTMAN HAM, LLP (57) ABSTRACT

A method for receiving multicast service data is provided. The method includes the following. A terminal device transmits first indication information to a network device, where the first indication information indicates a target multicast service. The terminal device receives at least one downlink control information (DCI) transmitted by the network device, where the at least one DCI is used for scheduling the target multicast service. The terminal device restarts a (Continued)

bandwidth part (BWP) inactivity timer when the terminal device receives on a first BWP, according to the at least one DCI, data of the target multicast service transmitted by the network device.

18 Claims, 4 Drawing Sheets

(56) References Cited

U.S. PATENT DOCUMENTS

| 2023/0040690 A1* | 2/2023 | Chen | H04W 72/30 |
| 2023/0110787 A1* | 4/2023 | Li | H04W 48/16 370/503 |

FOREIGN PATENT DOCUMENTS

| EP | 4055927 A1 | 9/2022 |
| WO | 2019242481 A1 | 12/2019 |
| WO | 2020087263 A1 | 5/2020 |

OTHER PUBLICATIONS

The partial supplementary European search report issued in corresponding EP application No. 21825599.0 dated Oct. 24, 2023.
Ericsson, Multicast service notification for UEs in connected mode, 3GPP TSG-RAN WG2 #97 Tdoc R2-1701075, Feb. 3, 2017.
WIPO, International Search Report and Written Opinion for International Application No. PCT/CN2021/086680, Jul. 1, 2021.

* cited by examiner

METHOD FOR RECEIVING MULTICAST SERVICE DATA, TERMINAL DEVICE, AND NON-TRANSITORY COMPUTER-READABLE STORAGE MEDIUM

CROSS-REFERENCE TO RELATED APPLICATION(S)

This application is a National Stage of International Application No. PCT/CN2021/086680, filed Apr. 12, 2021, which claims priority to Chinese Patent Application No. 202010551551.2, filed on Jun. 16, 2020, both of which are incorporated herein by reference in their entireties.

TECHNICAL FIELD

This disclosure relates to the field of communication technology, and particularly to a method for receiving multicast service data, a terminal device, and a non-transitory computer-readable storage medium.

BACKGROUND

With a multimedia broadcast multicast service (MBMS) function, multimedia video information can be directly broadcasted to all users. In a single-cell point-to-multipoint (SC-PTM) mechanism, multicast-service transmission can be scheduled in each cell separately. SC-PTM is a way of multicast-service transmission on a physical downlink shared channel (PDSCH).

At present, a terminal device can receive a unicast service on an active bandwidth part (BWP). After introduction of an MBMS service, the terminal device still tends to be camped on the active BWP to receive a multicast service, but such reception can be performed only before a BWP inactivity timer (bwp-InactivityTimer) expires. The terminal device can operate on the active BWP before the BWP inactivity timer expires. However, when the BWP inactivity timer expires, the terminal device has to switch to other BWPs configured by a network, and the terminal device may be unable to continue receiving the multicast service on the BWP that the terminal device switched to. If the BWP inactivity timer expires while the terminal device is receiving an MBMS service, the terminal device will switch to a BWP that does not support reception of the MBMS service, and as a result, the reception of the MBMS service will be interrupted, which affects user experience.

SUMMARY

The disclosure provides a method for receiving multicast service data, a terminal device, and a non-transitory computer-readable storage medium.

In a first aspect, a method for receiving multicast service data is provided in implementations of the disclosure. The method includes the following. A terminal device transmits first indication information to a network device, where the first indication information indicates a target multicast service. The terminal device receives at least one downlink control information (DCI) transmitted by the network device, where the at least one DCI is used for scheduling the target multicast service. The terminal device restarts a bandwidth part (BWP) inactivity timer when the terminal device receives on a first BWP, according to the at least one DCI, data of the target multicast service transmitted by the network device.

In a second aspect, a terminal device is provided in implementations of the disclosure. The terminal device includes a transceiver, a processor, and a memory. The memory stores a computer program which, when executed by the processor, causes the transceiver to: transmit first indication information to a network device, where the first indication information indicates a target multicast service; and receive at least one DCI transmitted by the network device, where the at least one DCI is used for scheduling the target multicast service. The computer program is further executed by the processor to cause the processor to restart a BWP inactivity timer when the terminal device receives on a first BWP, according to the at least one DCI, data of the target multicast service transmitted by the network device.

In a third aspect, a non-transitory computer-readable storage medium is provided in implementations of the disclosure. The storage medium stores a computer program. The computer program is executed by a terminal device to perform the following. Transmit first indication information to a network device, where the first indication information indicates a target multicast service. Receive at least one DCI transmitted by the network device, where the at least one DCI is used for scheduling the target multicast service. Restart a BWP inactivity timer when the terminal device receives on a first BWP, according to the at least one DCI, data of the target multicast service transmitted by the network device.

BRIEF DESCRIPTION OF THE DRAWINGS

In order to describe technical solutions of implementations of the disclosure more clearly, the following will give a brief introduction to the accompanying drawings used for describing the implementations. Apparently, the accompanying drawings described below are some implementations of the disclosure. Based on these accompanying drawings, those of ordinary skill in the art can also obtain other accompanying drawings without creative effort.

DETAILED DESCRIPTION

The following will describe technical solutions of implementations of the disclosure clearly and completely with reference to the accompanying drawings in the implementations of the disclosure.

In order for better understanding of the implementations of the disclosure, the following will introduce technical terms related to the implementations of the disclosure.

Bandwidth part (BWP): In a new radio (NR) system, a maximum channel bandwidth of each carrier can be up to 400 megahertz (MHz), which is far larger than a 20 MHz bandwidth of a long term evolution (LTE) system. In initial access, if a terminal device directly accesses the bandwidth of 400 MHz, it will lead to not only relatively high hardware cost of the terminal device but also relatively high power consumption. This problem can be solved with a BWP. There can be one or more BWPs for each serving cell, and each BWP occupies a limited bandwidth. In the NR system, a network device can allocate different BWPs to different terminal devices to adjust network resources dynamically. Each BWP corresponds to a set of configuration parameters, such as a location parameter of a physical resource block occupied, a control resource set (CORESET) configuration parameter, a physical downlink shared channel (PDSCH) configuration parameter, a physical uplink control channel (PUCCH) configuration parameter, a physical uplink shared channel (PUSCH) configuration parameter, a reference signal, a random access channel (RACH) configuration parameter, etc. The terminal device can use a BWP only after knowing configuration parameters corresponding to the BWP. A BWP may include an initial BWP, an active BWP, and a default BWP. An active BWP may be an initial BWP, a default BWP, or other BWPs configured by a network.

Initial BWP: mainly used in an initial access procedure, such as system information (i.e. system information block type 1 (SIB1)) reception, as well as reception of a random access response (RAR) and message (Msg) 4 and transmission of preamble and Msg4 in a random access procedure.

Active BWP: a BWP configured for the terminal device by the network device after initial access is completed. After initial access is completed, the terminal device may have various service requirements. Therefore, for a terminal device with high requirements, the access network device can configure an active BWP for the terminal device to be a BWP with a wider bandwidth than an initial BWP. For a terminal device with low requirements, the access network device can configure the active BWP for the terminal device to be a BWP with a smaller bandwidth than the initial BWP, or configure the active BWP for the terminal device to be the initial BWP. For a serving cell, a base station can configure multiple BWPs for the terminal device, for example, up to 4 BWPs, but only one of the multiple BWPs is an active BWP, that is, the terminal device can only use the active BWP to receive downlink control information (DCI) of the base station, receive data, and transmit data to the base station. On the active BWP, the terminal device detects DCI for the terminal device in one or more configured CORESETs. For a CORESET, there may be two types of search space: common search space and user equipment (UE)-specific search space. The terminal device performs DCI blind detection in a search space according to specific rules, detects the DCI for the terminal device according to a radio network temporary identifier (RNTI) of the terminal device, and then receives or transmits data according to the DCI, where one terminal device can have one or more RNTIs. The terminal device in idle state receives system information and a paging message on the initial BWP, such that the network device establishes radio resource control (RRC) connection and data radio bearer. For one terminal device, the base station can configure multiple BWPs for the terminal device according to capability, service requirements, etc. of the terminal device. Each terminal device, such as a UE supporting carrier aggregation, can have at least one active BWP. Multiple activated serving cells each can have one active BWP.

Default BWP: If the terminal device has no service requirements for long, the terminal device switches from an active BWP having a wide bandwidth to a default BWP that usually has a small bandwidth, which is possible to reduce power consumption. Therefore, a UE operating on a default BWP usually cannot receive a multicast service.

Single cell multicast control channel (SC-MCCH): a point-to-multipoint (PTM) channel used for multimedia broadcast multicast service (MBMS) service scheduling and transmission of control information. A list corresponding to all MBMS services transmitted by the network device can be transmitted on an SC-MCCH, where the list includes a temporary mobile group identity (TMGI), a session (service) identity (ID), a group RNTI (G-RNTI), and scheduling information of each MBMS service. The scheduling information may include scheduling slot information. A session corresponding to the session ID is data of the MBMS service. It is to be noted that, a new name may be adopted to refer to the SC-MCCH in an NR protocol in the future.

Single cell multicast traffic channel (SC-MTCH): a PTM channel used for transmitting MBMS service data. It is to be noted that, a new name may be adopted to refer to the SC-MTCH in an NR protocol in the future.

In order for better understanding of implementations of the disclosure, the following will elaborate a network architecture to which implementations of the disclosure can be applied.

Figure 1:
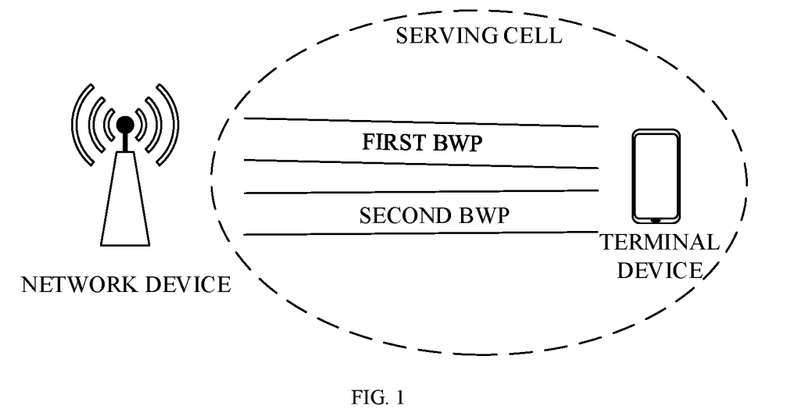
FIG. 1 is a schematic diagram illustrating a network architecture for a method for receiving multicast service data provided in implementations of the disclosure.
Figure 2:
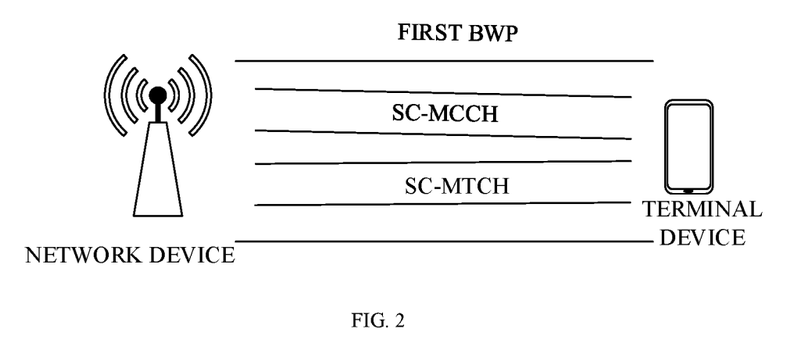
FIG. 2 is a schematic structural diagram of a first bandwidth part (BWP) provided in implementations of the disclosure.

Referring to FIG. 1, FIG. 1 is a schematic diagram illustrating a network architecture for a method for receiving multicast service data provided in implementations of the disclosure. As illustrated in FIG. 1, the network architecture for a method for receiving multicast service data includes a network device and a terminal device. The terminal device establishes a connection with the network device via a serving cell, where the serving cell is configured with a first BWP and a second BWP. The first BWP may be an active BWP, and the second BWP may be a default BWP. In practice, one serving cell may have more than two BWPs, and in implementations of the disclosure, one serving cell exemplarily has two BWPs, which is not limited herein. Referring to FIG. 2, FIG. 2 is a schematic structural diagram of a first BWP provided in implementations of the disclosure. As illustrated in FIG. 2, the first BWP at least has two channels including an SC-MCCH and an SC-MTCH, and transmission of MBMS services can be realized with the two channels, that is, the terminal device can receive multicast services on the first BWP. The first BWP may further have other types of channels.

The network device in implementations of the disclosure is an entity at a network side for transmitting or receiving signals. The network device can be configured for mutually conversion between an over-the-air frame and an internet protocol (IP) packet that are received, and serve as a router between the terminal device and a rest portion of an access network, where the rest portion of the access network may include an IP network, etc. The network device may coordinate attribute management of an air interface. For example, the network device may be eNB in LTE, an NR controller, gNB in a 5th generation (5G) system, a centralized unit, an NR base station, a remote radio module, a micro base station, a relay, a distributed unit, a transmission reception point (TRP), a transmission point (TP), or any other radio access device. Implementations of the disclosure are not limited in this regard.

The terminal device in implementations of the disclosure is an entity at a user side for receiving or transmitting signals. The terminal device may be a device that provides voice and/or data connectivity to a user, for example, a handheld device, an in-vehicle device, etc. that have wireless connection functions. The terminal device may also be other processing devices connected to a wireless modem. The terminal device can communicate with a radio access network (RAN). The terminal device may also be referred to as a wireless terminal, a subscriber unit, a subscriber station, a mobile station, a remote station, an access point, a remote terminal, an access terminal, a user terminal, a user agent, a user device, or a UE, etc. The terminal device may be a mobile terminal, such as a mobile phone (or referred to as "cellular" phone) and a computer with a mobile terminal, which may be, for example, a portable, pocket-sized, handheld, computer built-in, or in-vehicle mobile device that exchanges language and/or data with the RAN. For example, the terminal device may also be a personal communication service (PCS) phone, a cordless phone, a session initiation protocol (SIP) phone, a wireless local loop (WLL) station, a personal digital assistant (PDA), etc. A common terminal device includes, for example, a mobile phone, a tablet computer, a laptop, a palmtop, a mobile internet device (MID), a vehicle, a roadside device, an aircraft, and a wearable device such as a smart watch, a smart bracelet, and a pedometer, etc. Implementations of the disclosure are not limited in this regard. The following will describe in detail a communication method and related devices provided in the disclosure.

In the related art, in order for both a terminal device in idle state and a terminal device in connected state to receive a multicast service, the network device usually broadcasts a multicast service on an initial BWP. For the terminal device in connected state, the network device can configure an active BWP to include the initial BWP. In other words, the active BWP may be the initial BWP. In this case, the first BWP is exactly the initial BWP. Or the active BWP contains the initial BWP, and a bandwidth of the active BWP is larger than a bandwidth of the initial BWP. In this case, the first BWP contains the initial BWP and has a larger bandwidth than the initial BWP. The terminal device in connected state can receive, on an SC-MCCH in the active BWP, scheduling information of a multicast service the terminal device is interested in, and receive, according to the scheduling information, data of the multicast service on an SC-MTCH. The terminal device can receive a multicast service on the first BWP only when the terminal device is operating on the first BWP and a BWP inactivity timer is running. If the BWP inactivity timer expires while the terminal device is receiving the data of the multicast service the terminal device is interested in, the terminal device has to switch to a default BWP configured by the network device. However, the terminal device cannot receive a multicast service as usual on the default BWP, and as a result, reception of the data of the multicast service the terminal device is interested in will be interrupted, which affects user experience.

In order to avoid interruption of reception of multicast service data, implementations of the disclosure provide a method for receiving multicast service data and a communication apparatus. The following will describe in detail the method for receiving multicast service data and the communication apparatus provided in implementations of the disclosure.

Figure 3:
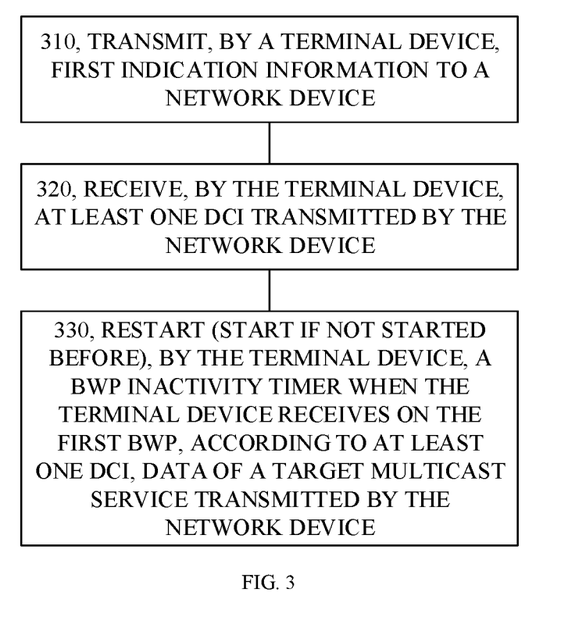
FIG. 3 is a schematic flow chart of a method for receiving multicast service data provided in implementations of the disclosure.

Referring to FIG. 3, FIG. 3 is a schematic flow chart of a method for receiving multicast service data provided in implementations of the disclosure.

In 310, a terminal device transmits first indication information to a network device.

The terminal device can firstly transmit the first indication information to the network device. The first indication information may be RRC signaling, and indicates a multicast service the terminal device is interested in or a multicast service the terminal device expects to receive, that is, a target multicast service, where the target multicast service may be one or multiple. The terminal device may firstly transmit the first indication information to the network device via a serving cell currently accessed. Once the first indication information is received by the network device, the network device can transmit acknowledgement (ACK) information to the terminal device, where the ACK information indicates that the first indication information is received by the network device. On condition that the terminal device confirms that the network device has obtained the first indication information, the terminal device can restart a BWP inactivity timer only when scheduling information of the multicast service the terminal device is interested in is received by the terminal device, such that the network device side can handle the BWP inactivity timer in the same manner as the terminal device side, thereby maintaining operation stability of the terminal device.

In a possible implementation, the terminal device transmits the first indication information to the network device, and then the terminal device needs to confirm that the network device has received the indication information. The terminal device may also confirm that the network device has obtained the first indication information in the following manners. A radio link control (RLC) layer of the terminal device has received ACK information of signaling of the target multicast service reported by the terminal device. Or a physical layer of the terminal device has received ACK signaling which is fed back by the network device and indicates that uplink transmission is received, where the transmission contains the first indication information transmitted by the terminal device. Or a media access control (MAC) layer of the terminal device confirms that the first indication information has been transmitted to the network device.

Before the terminal device transmits the first indication information to the network device, the terminal device can receive system information transmitted by the network device, where the system information indicates at least one multicast service that will be broadcasted on a first BWP by the network device or at least one multicast service that is being broadcasted by the network device. The terminal device can determine the target multicast service from the at least one multicast service indicated by the system information, where the target multicast service is a multicast service the terminal device is interested in. The target multicast service may be determined based on user requirements by an application layer of the terminal device, or may be determined in other manners, and implementations of the disclosure are not limited in this regard. For example, according to the system information transmitted by the network device, the terminal device knows that an MBMS service(s) that will be transmitted by the network device includes session 1, session 2, and session 3. If the terminal device determines that session 2 is an MBMS service the terminal device is interested in, the terminal device can determine session 2 as the target multicast service, and generate the first indication information and then transmit the first indication information to the network device, where the first indication information can indicate the target multicast service as described above. Accordingly, after the first indication information is received by the network device, the network device can transmit the ACK information to the terminal device.

In 320, the terminal device receives at least one DCI transmitted by the network device.

After the terminal device determines that the network device has obtained the first indication information, the terminal device can receive the at least one DCI transmitted by the network device, where the at least one DCI may be at least one DCI used for scheduling the target multicast service. Before receiving the at least one DCI transmitted by the network device, the terminal device needs to obtain on an SC-MCCH a G-RNTI and scheduling slot information of the multicast service, where the SC-MCCH is transmitted in the first BWP. The G-RNTI may also be in other names, and is used for the terminal device to identify DCI when receiving the multicast service. According to the G-RNTI and the scheduling slot information obtained, the terminal device can detect, in a specific slot, DCI scrambled by the G-RNTI, where the DCI can indicate that the terminal device can receive, on a specific time-frequency resource, data of the target multicast service scheduled by the DCI. It is to be noted that, the at least one DCI may be received on a physical downlink control channel (PDCCH) by the terminal device. The terminal device can detect, in at least one CORESET configured, the DCI scrambled by the G-RNTI. The CORESET may have two types of search space, namely common search space and terminal device-specific search space (i.e. UE-specific search space). The terminal device can perform DCI blind detection in a search space according to specific rules. For example, the terminal device can detect DCI for the terminal device according to an RNTI of the terminal device, and then receive or upload service data according to the DCI.

In 330, the terminal device restarts (starts if not started before) the BWP inactivity timer when the terminal device receives on the first BWP, according to the at least one DCI, data of the target multicast service transmitted by the network device.

Once the at least one DCI corresponding to the target multicast service, that is, at least one DCI scrambled by the G-RNTI, is received by the terminal device, the terminal device can receive the data of the target multicast service on a time-frequency resource indicated by the at least one DCI, where the time-frequency resource may be an SC-MTCH and be mapped onto a PDSCH. Since the terminal device expects to receive a multicast service, the network device can configure the terminal device to operate on the first BWP, that is, the first BWP is an active BWP. When the terminal device receives on the first BWP the data of the target multicast service transmitted by the network device, the terminal device restarts (or starts if not started before) the BWP inactivity timer. In the related art, the terminal device has to switch to a default BWP if the BWP inactivity timer expires, and as a result, reception of the data of the target multicast service will be interrupted. In contrast, in implementations of the disclosure, the terminal device restarts (or starts) the BWP inactivity timer when the terminal device begins to receive the data of the target multicast service, such that the terminal device can remain camped on the first BWP and continue to receive the data of the target multicast service. In general, DCI for scheduling a multicast service and data of the multicast service are transmitted in the same slot. In this case, the terminal device restarts (or starts) the BWP inactivity timer when the DCI is received by the terminal device or when the terminal device receives the multicast data, which leads to the same result of the terminal device. If DCI for scheduling a multicast service and data of the multicast service are transmitted in different slots, for example, the DCI is in slot 1 while the data of the multicast service scheduled by the DCI is in slot 2, the terminal device restarts (or starts) the BWP inactivity timer when the DCI is received by the terminal device, or restarts (or starts) the BWP inactivity timer when the terminal device receives the data of the multicast service, both of which are possible schemes. The above two manners are included in step 330, and only one mechanism will be specified in a protocol. Preferably, the terminal device restarts (or starts) the BWP inactivity timer when DCI for scheduling a multicast service is received.

In a possible implementation, besides restarting (or starting) the BWP inactivity timer when the terminal device begins to receive the data of the target multicast service on a specific time-frequency resource according to the at least one DCI, the terminal device can also restart (or start) the BWP inactivity timer when the at least one DCI is received by the terminal device. The terminal device may receive multiple repeated transmissions of the data of the target multicast service. Therefore, when receiving multiple repeated transmissions of data of one multicast service, the terminal device restarts (or starts) the BWP inactivity timer each time DCI corresponding to the data of the multicast service is received.

The terminal device may receive the at least one DCI, where each of the at least one DCI corresponds to one different transmission of the target multicast service, that is, one DCI may correspond to one transmission of the target multicast service. One complete target multicast service can be transmitted at least once, and each transmission is scheduled by one DCI. For example, after the system information transmitted by the network device is received by the terminal device, the terminal device knows that the network device will broadcast on the first BWP multicast services including session 1, session 2, and session 3, and the terminal device determines session 2 as the target multicast service. If one DCI for scheduling session 2 is received by the terminal device, the terminal device can restart (or start) once the BWP inactivity timer when the terminal device receives session 2 on an SC-MTCH. If three DCIs for scheduling session 2 are received by the terminal device, it indicates that session 2 will be transmitted on the SC-MTCH three times. The terminal device may restart (or start) the BWP inactivity timer each time session 2 is transmitted, which is possible to ensure that the terminal device can receive session 2 completely each time. By receiving session 2 multiple times, it is possible to ensure decoding accuracy of the terminal device, and also increase error tolerance for transmission. The terminal device may also restart (or start) the BWP inactivity timer at one of the three transmissions of session 2 if the three transmissions are multiple transmissions for the same transmission block. If a duration of the BWP inactivity timer is long, restarting the timer once is enough to ensure that the terminal device remains camped on the first BWP to continue receiving the multicast service.

In a possible implementation, before restarting (or starting) the BWP inactivity timer when the terminal device receives on the first BWP, according to the at least one DCI, the data of the target multicast service transmitted by the network device, the terminal device can receive configuration signaling transmitted by the network device, where the configuration signaling indicates that the terminal device is allowed to restart (or start) the BWP inactivity timer when the terminal device receives the multicast service. In other words, only after the terminal device is configured by the network device, the terminal device can restart (or start) the BWP inactivity timer when the terminal device receives the target multicast service, such that the network device can handle the BWP inactivity timer in the same manner as the terminal device. Specifically, if the terminal device indicates that the terminal device is interested in session 2, the network device configures that the terminal device restarts (or starts) the BWP inactivity timer when the terminal device receives data of session 2.

In a possible implementation, if the network device has already broadcast on the first BWP at least one target multicast service before the terminal device transmits the first indication information to the network device, the terminal device has no right to restart the BWP inactivity timer because the terminal device has transmitted no first indication information to the network device. If the BWP inactivity timer expires after the at least one DCI transmitted by the network device is received by the terminal device, reception of the data of the target multicast service by the terminal device will be interrupted. However, in implementations of the disclosure, the terminal device can still be camped on the first BWP in this case. In other words, even though the BWP inactivity timer expires, the terminal device can continue receiving the data of the target multicast service on the first BWP. For the network device, since the network device knows that the BWP inactivity timer expires, the network device will consider that the terminal device has switched to other BWPs such as a default BWP. Therefore, the terminal device needs to transmit second indication information to the network device, where the second indication information indicates that the terminal device is camped on the first BWP. The terminal device may transmit the second indication information through random access. In other words, the terminal device initiates a random access procedure on the first BWP, such that the network device can know that the terminal device is still camped on the first BWP. The second indication information may be signaling, or may be indicated through the random access procedure. It is to be noted that, although the network device has already broadcast on the first BWP at least one multicast service before the terminal device determines that the first indication information is obtained by the network device, the terminal device can still receive the system information transmitted by the network device, and determine the target multicast service according to the system information.

In a possible implementation, before the terminal device transmits on the first BWP the first indication information to the network device, if the terminal device operates on a second BWP and the terminal device has determined the target multicast service, the terminal device can switch to the first BWP actively, where the terminal device cannot receive the target multicast service on the second BWP. In general, the terminal device can receive a multicast service only if a search space for receiving DCI corresponding to the multicast service is configured for the terminal device by the network device. When the terminal device operates on the second BWP, the terminal device can determine, according to search space configuration, whether the target multicast service can be received. After switching to the first BWP from the second BWP, the terminal device can receive the target multicast service on the first BWP through the procedure described above. In addition, the terminal device may also determine the target multicast service on the second BWP. The terminal device may take into consideration the system information received or multicast service information stored, and determine the target multicast service according to the system information or the information stored, thereby switching to the first BWP actively. After switching to the first BWP, the terminal device can transmit to the network device third indication information, where the third indication information indicates that the terminal device is camped on the first BWP. The network device does not know that the terminal device has switched to the first BWP from the second BWP, and the network device can be informed by the third indication information. In addition, the terminal device may transmit the third indication information through random access.

According to implementations of the disclosure, after transmitting the first indication information to the network device, the terminal device receives the at least one DCI transmitted by the network device, and receives the target multicast service scheduled by the at least one DCI. The terminal device restarts (or starts) the BWP inactivity timer when the terminal device receives on the first BWP, according to the at least one DCI, the data of the target multicast service transmitted by the network device. As such, the terminal device can have enough time to receive the data of the target multicast service. By implementing implementations of the disclosure, it is possible to avoid interruption of reception of the data of the target multicast service that is caused by expiry of the BWP inactivity timer.

Figure 4:
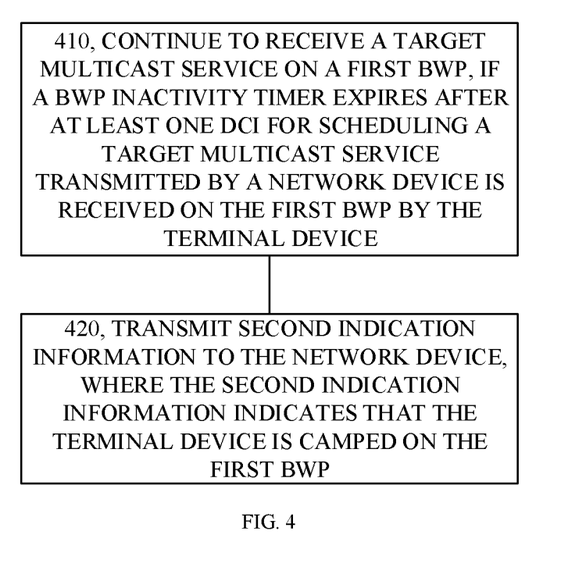
FIG. 4 is a schematic flow chart of another method for receiving multicast service data provided in implementations of the disclosure.

Referring to FIG. 4, FIG. 4 is a schematic flow chart of another method for receiving multicast service data provided in implementations of the disclosure.

In 410, continue to receive on a first BWP a target multicast service transmitted by a network device, if a BWP inactivity timer expires after at least one DCI transmitted by the network device is received on the first BWP by a terminal device, where the at least one DCI is used for scheduling the target multicast service.

Before the terminal device transmits first indication information to the network device, the network device has already broadcast at least one multicast service on the first BWP. In this case, after the at least one DCI is received by the terminal device, despite expiry of the BWP inactivity timer, the terminal device can still be camped on the first BWP to receive the target multicast service transmitted by the network device.

In 420, transmit second indication information to the network device, where the second indication information indicates that the terminal device is camped on the first BWP.

In implementations of the disclosure, in case the target multicast service is not reported to the network device by the terminal device, the terminal device can still receive on the first BWP the target multicast service transmitted by the network device even though the BWP inactivity timer expires. By implementing the method, it is possible to avoid interruption of reception of data of the target multicast service that is caused by expiry of the BWP inactivity timer.

Figure 5:
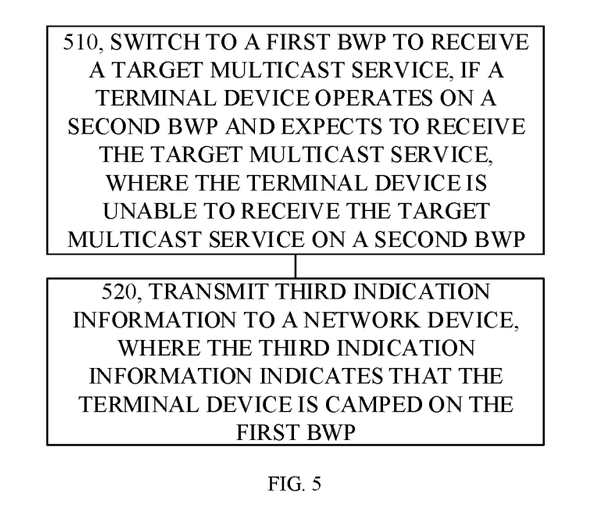
FIG. 5 is a schematic flow chart of another method for receiving multicast service data provided in implementations of the disclosure.

Referring to FIG. 5, FIG. 5 is a schematic flow chart of another method for receiving multicast service data provided in implementations of the disclosure.

In 510, switch to a first BWP to receive a target multicast service, if a terminal device operates on a second BWP and expects to receive the target multicast service, where the terminal device is unable to receive the target multicast service on the second BWP.

The case where the terminal device expects the target multicast service may be that the terminal device takes into consideration system information received or multicast service information stored, and determines the target multicast service according to the system information or the information stored. As such, the terminal device can switch to the first BWP actively. After switching to the first BWP, the terminal device may receive at least one DCI, and receive, according to the at least one DCI, a corresponding target multicast service on an SC-MTCH in the first BWP.

For example, the terminal device is in a discontinuous reception (DRX) period and camped on a non-active BWP. In other words, the terminal device is unable to receive an MBMS service, and may have to wait for a next on-duration to transmit a scheduling request for an MBMS service, which results in a long delay. Therefore, the terminal device can switch to an active BWP actively during the DRX period.

In 520, transmit third indication information to a network device, where the third indication information indicates that the terminal device is camped on the first BWP.

In a possible implementation, the terminal device may restart a BWP inactivity timer when the terminal device receives the target multicast service.

In implementations of the disclosure, if the terminal device expects to receive the target multicast service determined, the terminal device can switch to an active BWP actively. As such, reception of the target multicast service can be more flexible and will not be completely restricted by a status of the BWP inactivity timer.

Figure 6:
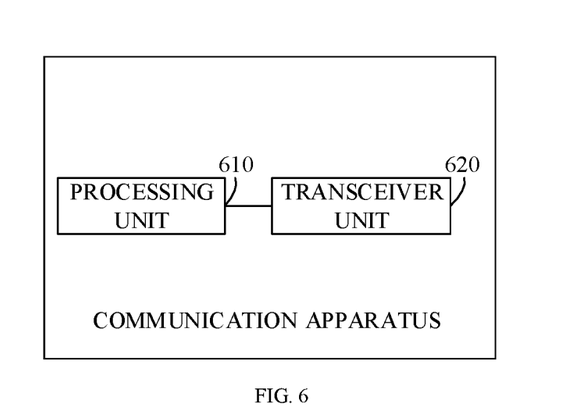
FIG. 6 is a schematic diagram illustrating units of a communication apparatus provided in implementations of the disclosure.

Referring to FIG. 6, FIG. 6 is a schematic diagram illustrating units of a communication apparatus provided in implementations of the disclosure. The communication apparatus illustrated in FIG. 6 can be configured to implement some or all functions of the terminal device in the foregoing method implementations illustrated in FIG. 3, FIG. 4, and FIG. 5. The apparatus may be a terminal device, may be an apparatus in a terminal device, or may be an apparatus that can be used together with a terminal device. In terms of logic structure, the apparatus includes a processing unit 610 and a transceiver unit 620. The processing unit 610 is configured for a terminal device to transmit first indication information to a network device, where the first indication information indicates a target multicast service. The transceiver unit 620 is configured for the terminal device to receive at least one DCI transmitted by the network device, where the at least one DCI is used for scheduling the target multicast service. The processing unit 610 is further configured to restart a BWP inactivity timer when the terminal device receives on a first BWP, according to the at least one DCI, data of the target multicast service transmitted by the network device.

In a possible implementation, the transceiver unit 620 is further configured to receive system information transmitted by the network device, before the terminal device transmits the first indication information to the network device, where the system information indicates at least one multicast service broadcasted on the first BWP by the network device. The processing unit 610 is further configured to determine the target multicast service from the at least one multicast service.

In a possible implementation, the transceiver unit 620 is further configured to receive ACK information transmitted by the network device, after the terminal device transmits the first indication information to the network device, where the ACK information indicates that the first indication information is received by the network device.

In a possible implementation, the processing unit 610 is further configured to restart the BWP inactivity timer each time the terminal device receives the target multicast service on the first BWP according to the at least one DCI, or restart once the BWP inactivity timer when the terminal device receives the target multicast service on the first BWP according to the at least one DCI.

In a possible implementation, the transceiver unit 620 is further configured to receive configuration signaling transmitted by the network device, before restarting the BWP inactivity timer when the terminal device receives on the first BWP, according to the at least one DCI, the data of the target multicast service transmitted by the network device, where the configuration signaling indicates that the terminal device is allowed to restart the BWP inactivity timer.

In a possible implementation, the transceiver unit 620 is further configured to continue to receive on the first BWP the target multicast service transmitted by the network device if the BWP inactivity timer expires after the at least one DCI transmitted by the network device is received by the terminal device, before the terminal device transmits the first indication information to the network device. The transceiver unit 620 is further configured to transmit second indication information to the network device, where the second indication information indicates that the terminal device is camped on the first BWP.

In a possible implementation, the processing unit 610 is further configured to switch to the first BWP if the terminal device operates on a second BWP and expects to receive the target multicast service, before the terminal device transmits the first indication information to the network device, where the terminal device is unable to receive the target multicast service on the second BWP. The transceiver unit 620 is further configured to transmit third indication information to the network device, where the third indication information indicates that the terminal device is camped on the first BWP.

The processing unit 610 is further configured to continue to receive on a first BWP a target multicast service, if a BWP inactivity timer expires after at least one DCI transmitted by a network device is received on the first BWP by a terminal device, where the at least one DCI is used for scheduling the target multicast service. The transceiver unit 620 is further configured to transmit second indication information to the network device, where the second indication information indicates that the terminal device is camped on the first BWP.

The processing unit 610 is further configured to switch to a first BWP to receive a target multicast service, if a terminal device operates on a second BWP and expects to receive the target multicast service, where the terminal device is unable to receive the target multicast service on the second BWP. The transceiver unit 620 is further configured to transmit third indication information to a network device, where the third indication information indicates that the terminal device is camped on the first BWP.

Figure 7:
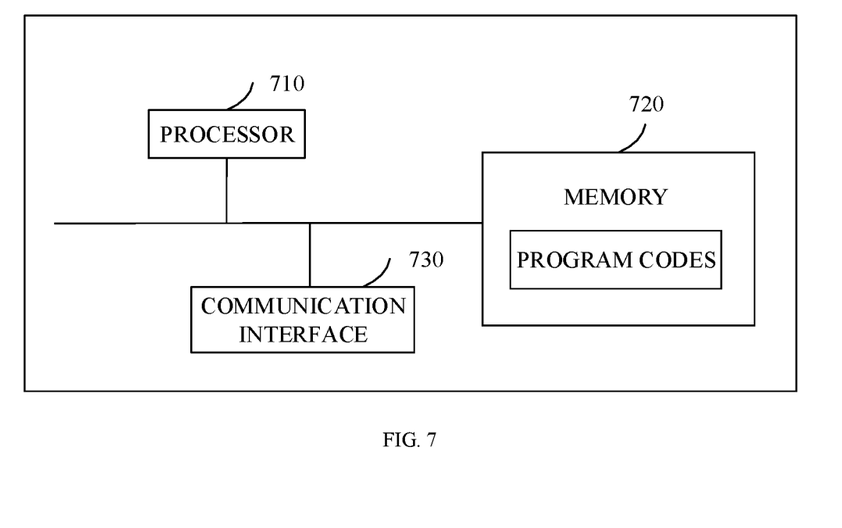
FIG. 7 is a schematic simplified diagram illustrating a physical structure of a communication apparatus provided in implementations of the disclosure.

Referring to FIG. 7, FIG. 7 is a schematic simplified diagram illustrating a physical structure of a communication apparatus provided in implementations of the disclosure. The apparatus includes a processor 710, a memory 720, and a communication interface 730. The processor 710, the memory 720, and the communication interface 730 are coupled together via one or more communication buses.

The processor 710 is configured to support the communication apparatus to implement functions corresponding to the methods illustrated in FIG. 3, FIG. 4, and FIG. 5. The processor 710 may be a central processing unit (CPU), a network processor (NP), a hardware chip, or any combination thereof.

The memory 720 is configured to store program codes, etc. The memory 720 may include a volatile memory, such as a random access memory (RAM). The memory 720 may also include a non-volatile memory, such as a read-only memory (ROM), a flash memory, a hard disk drive (HDD), or a solid-state drive (SSD). The memory 720 may also include a combination of the above types of memory.

The communication interface 730 is configured to transmit and receive data, information, or messages, etc., and may also be referred to as a transceiver, a transceiver circuit, etc. For example, the communication interface 730 is configured for a terminal device to receive at least one DCI transmitted by a network device, or receive system information transmitted by the network device, etc.

In implementations of the disclosure, when the communication apparatus is applied to a terminal device, the processor 710 can invoke the program codes stored in the memory 720 to perform the following operations. The processor 710 invokes the program codes stored in the memory 720 to cause the terminal device to transmit first indication information to a network device, where the first indication information indicates a target multicast service. The processor causes the terminal device to control the communication interface 730 to receive at least one DCI transmitted by the network device, where the at least one DCI is used for scheduling the target multicast service. The processor 710 invokes the program codes stored in the memory 720 to restart a BWP inactivity timer when the terminal device receives on a first BWP, according to the at least one DCI, data of the target multicast service transmitted by the network device.

In a possible implementation, the processor is configured to control the communication interface 730 to receive system information transmitted by the network device, before the terminal device transmits the first indication information to the network device, where the system information indicates at least one multicast service broadcasted on the first BWP by the network device. The processor 710 is further configured to determine the target multicast service from the at least one multicast service.

In a possible implementation, the processor is configured to receive ACK information transmitted by the network device, after controlling the communication interface 730 to transmit the first indication information to the network device, where the ACK information indicates that the first indication information is received by the network device.

In a possible implementation, the processor 710 invokes the program codes stored in the memory 720 to restart the BWP inactivity timer each time the terminal device receives the target multicast service on the first BWP according to the at least one DCI, or restart once the BWP inactivity timer when the terminal device receives the target multicast service on the first BWP according to the at least one DCI.

In a possible implementation, the processor is configured to control the communication interface 730 to receive configuration signaling transmitted by the network device, before restarting the BWP inactivity timer when the terminal device receives on the first BWP, according to the at least one DCI, the data of the target multicast service transmitted by the network device, where the configuration signaling indicates that the terminal device is allowed to restart the BWP inactivity timer.

In a possible implementation, the processor is configured to control the communication interface 730 to perform the following operations before the terminal device transmits the first indication information to the network device. Continue to receive on the first BWP the target multicast service transmitted by the network device, if the BWP inactivity timer expires after the at least one DCI transmitted by the network device is received by the terminal device. Transmit second indication information to the network device, where the second indication information indicates that the terminal device is camped on the first BWP.

In a possible implementation, the processor 710 invokes the program codes stored in the memory 720 to perform the following operations before the terminal device transmits the first indication information to the network device. Switch to the first BWP if the terminal device operates on a second BWP and expects to receive the target multicast service, where the terminal device is unable to receive the target multicast service on the second BWP; and control the communication interface 730 to transmit third indication information to the network device, where the third indication information indicates that the terminal device is camped on the first BWP.

The processor 710 invokes the program codes stored in the memory 720 to: continue to receive on a first BWP a target multicast service, if a BWP inactivity timer expires after at least one DCI transmitted by a network device is received by a terminal device; and control the communication interface 730 to transmit second indication information to the network device, where the second indication information indicates that the terminal device is camped on the first BWP.

The processor 710 invokes the program codes stored in the memory 720 to: switch to a first BWP to receive a target multicast service, if a terminal device operates on a second BWP and expects to receive the target multicast service, where the terminal device is unable to receive the target multicast service on the second BWP; and control the communication interface 730 to transmit third indication information to a network device, where the third indication information indicates that the terminal device is camped on the first BWP.

It is to be noted that, in the foregoing implementations, elaboration of each implementation has its own emphasis. For parts not described in detail in one implementation, reference can be made to related elaborations in other implementations.

Steps in the methods of implementations of the disclosure can be adjusted in execution order, combined, or deleted according to actual needs.

Units in the processing devices of implementations of the disclosure can be integrated, divided, or deleted according to actual needs.

All or part of the foregoing implementations can be implemented through software, hardware, firmware, or any other combination thereof. When implemented by software, all or part of the foregoing implementations can be implemented in the form of a computer program product. The computer program product includes one or more computer instructions. When the computer instructions are applied and executed on a computer, all or some of the operations or functions of the implementations of the disclosure are performed. The computer can be a general-purpose computer, a special-purpose computer, a computer network, or other programmable apparatuses. The computer instruction can be stored in a computer-readable storage medium, or transmitted from one computer-readable storage medium to another computer-readable storage medium. For example, the computer instruction can be transmitted from one website, computer, server, or data center to another website, computer, server, or data center in a wired manner or in a wireless manner. Examples of the wired manner can be a coaxial cable, an optical fiber, a digital subscriber line (DSL), etc. The wireless manner can be, for example, infrared, wireless, microwave, etc. The computer-readable storage medium can be any computer accessible usable-medium or a data storage device such as a server, a data center, or the like which integrates one or more usable media. The usable medium can be a magnetic medium (such as a soft disc, a hard disc, or a magnetic tape), an optical medium (such as a digital video disc (DVD)), or a semiconductor medium (such as a solid state disk (SSD)), etc.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for receiving multicast service data, the method being executed by a terminal device and comprising:
   transmitting first indication information to a network device, the first indication information indicating a target multicast service;
   receiving acknowledgement (ACK) information transmitted by the network device, wherein the ACK information indicates that the first indication information is received by the network device;
   obtaining a group-radio network temporary identifier (G-RNTI) and scheduling slot information of the target multicast service;
   detecting, according to the G-RNTI and the scheduling slot information, downlink control information (DCI) scrambled by the G-RNTI, wherein the DCI is used for scheduling the target multicast service; and
   restarting or starting a bandwidth part (BWP) inactivity timer when the DCI is received by the terminal device.

2. The method of claim 1, wherein before transmitting the first indication information to the network device, the method further comprises:
   receiving system information transmitted by the network device, wherein the system information indicates at least one multicast service broadcasted by the network device; and
   determining the target multicast service from the at least one multicast service.

3. The method of claim 1, wherein restarting or starting the BWP inactivity timer when the DCI is received by the terminal device comprises: restarting or starting the BWP inactivity timer when the terminal device receives on a first BWP, according to the DCI, data of the target multicast service transmitted by the network device; and
   wherein restarting or starting the BWP inactivity timer when the terminal device receives on the first BWP, according to the DCI, the data of the target multicast service transmitted by the network device comprises:
      restarting or starting the BWP inactivity timer each time the terminal device receives the target multicast service on the first BWP according to the DCI; or
      restarting or starting once the BWP inactivity timer when the terminal device receives the target multicast service on the first BWP according to the DCI.

4. The method of claim 1, wherein before restarting or starting the BWP inactivity timer when the DCI is received by the terminal device, the method further comprises:
   receiving configuration signaling transmitted by the network device, wherein the configuration signaling indicates that the terminal device is allowed to restart or start the BWP inactivity timer.

5. The method of claim 1, wherein restarting or starting the BWP inactivity timer when the DCI is received by the terminal device comprises: restarting or starting the BWP inactivity timer when the terminal device receives on a first BWP, according to the DCI, data of the target multicast service transmitted by the network device; and
   wherein before transmitting, by the terminal device, the first indication information to the network device, the method further comprises:
      continuing to receive on the first BWP the target multicast service transmitted by the network device, based on that the BWP inactivity timer expires after the DCI transmitted by the network device is received by the terminal device; and
      transmitting second indication information to the network device, wherein the second indication information indicates that the terminal device is camped on the first BWP.

6. The method of claim 1, wherein restarting or starting the BWP inactivity timer when the DCI is received by the terminal device comprises: restarting or starting the BWP inactivity timer when the terminal device receives on a first BWP, according to the DCI, data of the target multicast service transmitted by the network device; and
   wherein before transmitting the first indication information to the network device, the method further comprises:
      switching to the first BWP based on that the terminal device operates on a second BWP and expects to receive the target multicast service, wherein the terminal device is unable to receive the target multicast service on the second BWP; and
      transmitting third indication information to the network device, wherein the third indication information indicates that the terminal device is camped on the first BWP.

7. The method of claim 1, wherein the first indication information indicates the target multicast service the terminal device is interested in or the target multicast service the terminal device expects to receive.

8. A terminal device comprising:
   a transceiver;
   a processor coupled to the transceiver; and
   a memory storing a computer program which, when executed by the processor, causes the terminal device to:
      transmit first indication information to a network device, the first indication information indicating a target multicast service; and
      receive acknowledgement (ACK) information transmitted by the network device, wherein the ACK information indicates that the first indication information is received by the network device;
      obtain a group-radio network temporary identifier (G-RNTI) and scheduling slot information of the target multicast service;
      detect, according to the G-RNTI and the scheduling slot information, downlink control information (DCI) scrambled by the G-RNTI, wherein the DCI is used for scheduling the target multicast service; and
      restart or start a bandwidth part (BWP) inactivity timer when the DCI is received by the terminal device.

9. The terminal device of claim 8, wherein
   the computer program is further executed by the processor to cause the terminal device to:

receive system information transmitted by the network device, wherein the system information indicates at least one multicast service broadcasted by the network device; and determine the target multicast service from the at least one multicast service.

10. The terminal device of claim 8, wherein the computer program executed by the processor to cause the terminal device to restart or start the BWP inactivity timer is executed by the processor to cause the terminal device to: restart or start the BWP inactivity timer when the terminal device receives on a first BWP, according to the DCI, data of the target multicast service transmitted by the network device; and wherein the computer program executed by the processor to cause the terminal device to restart or start the BWP inactivity timer when the terminal device receives on the first BWP, according to the DCI, the data of the target multicast service transmitted by the network device is executed by the processor to cause the terminal device to:

restart or start the BWP inactivity timer each time the terminal device receives the target multicast service on the first BWP according to the DCI; or restart or start once the BWP inactivity timer when the terminal device receives the target multicast service on the first BWP according to the DCI.

11. The terminal device of claim 8, wherein the computer program is further executed by the processor to cause the terminal device to receive configuration signaling transmitted by the network device, wherein the configuration signaling indicates that the terminal device is allowed to restart or start the BWP inactivity timer.

12. The terminal device of claim 8, wherein the computer program executed by the processor to cause the terminal device to restart or start the BWP inactivity timer when the DCI is received by the terminal device is executed by the processor to cause the terminal device to restart or start the BWP inactivity timer when the terminal device receives on a first BWP, according to the DCI, data of the target multicast service transmitted by the network device; and the computer program is further executed by the processor to cause the terminal device to:

continue to receive on the first BWP the target multicast service transmitted by the network device, based on that the BWP inactivity timer expires after the DCI transmitted by the network device is received by the terminal device; and transmit second indication information to the network device, wherein the second indication information indicates that the terminal device is camped on the first BWP.

13. The terminal device of claim 8, wherein the computer program executed by the processor to cause the terminal device to restart or start the BWP inactivity timer when the DCI is received by the terminal device is executed by the processor to cause the terminal device to restart or start the BWP inactivity timer when the terminal device receives on a first BWP, according to the DCI, data of the target multicast service transmitted by the network device;

the computer program is further executed by the processor to cause the terminal device to switch to the first BWP based on that the terminal device operates on a second BWP and expects to receive the target multicast service, wherein the terminal device is unable to receive the target multicast service on the second BWP; and transmit third indication information to the network device, wherein the third indication information indicates that the terminal device is camped on the first BWP.

14. A non-transitory computer-readable storage medium storing a computer program, the computer program being executed by a terminal device to perform:

transmitting first indication information to a network device, the first indication information indicating a target multicast service;

receiving acknowledgement (ACK) information transmitted by the network device, wherein the ACK information indicates that the first indication information is received by the network device;

obtaining a group-radio network temporary identifier (G-RNTI) and scheduling slot information of the target multicast service;

detecting, according to the G-RNTI and the scheduling slot information, downlink control information (DCI) scrambled by the G-RNTI, wherein the DCI is used for scheduling the target multicast service; and restarting or starting a bandwidth part (BWP) inactivity timer when the DCI is received by the terminal device.

15. The non-transitory computer-readable storage medium of claim 14, wherein the computer program is further executed by the terminal device to perform:

receiving system information transmitted by the network device, wherein the system information indicates at least one multicast service broadcasted by the network device; and determining the target multicast service from the at least one multicast service.

16. The non-transitory computer-readable storage medium of claim 14, wherein the computer program executed by the terminal device to perform restarting or starting the BWP inactivity timer is executed by the terminal device to perform: restarting or starting the BWP inactivity timer when the terminal device receives on a first BWP, according to the DCI, data of the target multicast service transmitted by the network device; and wherein restarting or starting the BWP inactivity timer when the terminal device receives on the first BWP, according to the DCI, the data of the target multicast service transmitted by the network device comprises:

restarting or starting the BWP inactivity timer each time the terminal device receives the target multicast service on the first BWP according to the DCI; or restarting or starting once the BWP inactivity timer when the terminal device receives the target multicast service on the first BWP according to the DCI.

17. The non-transitory computer-readable storage medium of claim 14, wherein the computer program is further executed by the terminal device to perform:

receiving configuration signaling transmitted by the network device, wherein the configuration signaling indicates that the terminal device is allowed to restart the BWP inactivity timer.

18. The non-transitory computer-readable storage medium of claim 14, wherein the computer program executed by the terminal device to perform restarting or starting the BWP inactivity timer is executed by the terminal device to perform: restarting or starting the BWP inactivity timer when the terminal device receives on a first BWP, according to the DCI, data of the target multicast service transmitted by the network device; and wherein the computer program is further executed by the terminal device to perform:
  continuing to receive on the first BWP the target multicast service transmitted by the network device, based on that the BWP inactivity timer expires after the DCI transmitted by the network device is received by the terminal device; and
  transmitting second indication information to the network device, wherein the second indication information indicates that the terminal device is camped on the first BWP.

* * * * *